(12) United States Patent
Chu

(10) Patent No.: US 6,792,368 B2
(45) Date of Patent: *Sep. 14, 2004

(54) SYSTEM AND METHOD FOR HETERODYNE INTERFEROMETER HIGH VELOCITY TYPE NON-LINEARITY COMPENSATION

(75) Inventor: David C. Chu, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 10/052,673

(22) Filed: Jan. 17, 2002

(65) Prior Publication Data

US 2003/0144807 A1 Jul. 31, 2003

(51) Int. Cl.⁷ .......................... G01C 17/38; G01P 21/00
(52) U.S. Cl. ........................................................ 702/94
(58) Field of Search ........................... 702/85, 94, 106, 702/150, 151; 356/486, 487, 493, 498, 500, 484, 485

(56) References Cited

U.S. PATENT DOCUMENTS

| | | | |
|---|---|---|---|
| 4,912,468 A | * 3/1990 | Rust | 341/119 |
| 5,166,959 A | 11/1992 | Chu et al. | |
| 5,663,666 A | 9/1997 | Chu et al. | |
| 5,757,489 A | * 5/1998 | Kawakami | 356/500 |
| 5,991,033 A | * 11/1999 | Henshaw et al. | 357/487 |
| 6,137,574 A | * 10/2000 | Hill | 356/486 |
| 6,191,415 B1 | * 2/2001 | Stridsberg | 250/231.13 |
| 6,573,996 B1 | * 6/2003 | Deliwala et al. | 356/487 |
| 6,597,459 B2 | * 7/2003 | Demarest | 356/498 |
| 2001/0028759 A1 | * 10/2001 | Cao | 385/24 |
| 2002/0021449 A1 | * 2/2002 | Demarest | 356/498 |
| 2002/0089671 A1 | * 7/2002 | Hill | 356/486 |
| 2003/0086646 A1 | * 5/2003 | Rothenberg et al. | 385/87 |
| 2003/0098981 A1 | * 5/2003 | Chu | 356/496 |

OTHER PUBLICATIONS

"Single frequency laser interferometer with subnanometer accuracy"; T. Eom, T. Choi, Proc. of 2nd euspen International Conference—Turin, Italy—May 27th to 31st, 2001.

"High–resolution, High–speed, Low Data Age Uncertaintly, Heterodyne Displacement Measuring Interferometer Electronics"; Frank C. Demarest; Meas. Sci. Technol.; pp. 1024–1030; 1998.

"Spectrum" article; IEEE; pp. 28–32; 1988.

\* cited by examiner

Primary Examiner—John Barlow
Assistant Examiner—Dementrius Pretlow

(57) ABSTRACT

A system and method for compensating non-linearity of the high-velocity type manifested in heterodyne interferometer position data includes receiving a plurality of groups of digital position values. A plurality of groups of digital phase values from a measurement channel are received. A first group of the digital position values and digital phase values are digitally processed to generate a plurality of block data values. The plurality of block data values are digitally processed to generate at least one quasi-static non-linearity parameter. A second group of the digital position values are compensated based on the at least one quasi-static non-linearity parameter.

25 Claims, 7 Drawing Sheets

SYSTEM AND METHOD FOR HETERODYNE INTERFEROMETER HIGH VELOCITY TYPE NON-LINEARITY COMPENSATION

CROSS REFERENCE TO RELATED APPLICATIONS

This application is related to U.S. patent application Ser. No. 10/003,798, filed Oct. 26, 2001, entitled PHASE DIGITIZER, and U.S. patent application Ser. No. 10/010,175, filed Nov. 13, 2001, entitled SYSTEM AND METHOD FOR INTERFEROMETER NON-LINEARITY COMPENSATION.

THE FIELD OF THE INVENTION

This invention relates generally to interferometer systems. This invention relates more particularly to a system and method for heterodyne interferometer compensation of a type of non-linearity occurring at high velocity.

BACKGROUND OF THE INVENTION

Light leakage between beams in an interferometer in metrology produces measurement results that depart periodically from the ideal—known as non-linearity.

One prior art technique for compensating for non-linearity in a homodyne interferometer involves balancing the two in-phase and quadrature signals within the interferometer for offset, gain and orthogonality. The signals are digitized, computed for imbalance, and analog electronics are used to inject offset and gain compensations. The compensation components are all contained within the interferometer itself. In a heterodyne interferometer, there are no in-phase and quadrature signals to balance. Thus, such a compensation method is not applicable to a heterodyne interferometer.

It would be desirable to provide a system and method for non-linearity compensation of interferometer position data using digital numerical processing, wherein the non-linearity is of a type that occurs at high velocities.

SUMMARY OF THE INVENTION

One form of the present invention provides a method for compensating non-linearity of the high-velocity type manifested in heterodyne interferometer position data. A plurality of groups of digital position values are received. A plurality of groups of digital phase values from a measurement channel are received. A first group of the digital position values and digital phase values are digitally processed to generate a plurality of block data values. The plurality of block data values are digitally processed to generate at least one quasi-static non-linearity parameter. A second group of the digital position values are compensated based on the at least one quasi-static non-linearity parameter.

DESCRIPTION OF THE PREFERRED EMBODIMENTS

In the following detailed description of the preferred embodiments, reference is made to the accompanying drawings, which form a part hereof and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Displacement Measuring Interferometry System

The non-linearity compensation system and method of the present invention is discussed in the context of a heterodyne displacement measuring interferometry system.

A typical displacement measuring interferometer system consists of a frequency-stabilized laser light source, interferometer optics and measuring electronics. In metrology based on homodyne interferometry, the phase progression function $\phi(t)$ is directly proportional to the object displacement in time, t, usually by the factor $\lambda/4$. That is, one unit interval (UI) change represents an object movement of one-quarter of the wavelength of the light wave. One UI represents one light wave interference fringe, or $2\pi$ radians. In mixing, phase is preserved, a travel of $\lambda/4$ is manifested as one interference fringe. In metrology based on heterodyne interferometry, there are two channels: one Doppler-shifted (Measurement Channel), and the other not shifted (Reference Channel). The difference between the two phase progression functions $\phi_M(t)$ and $\phi_R(t)$ of the two channels is proportional to the object displacement to within an arbitrary constant. The phase-progression functions for both channels are monotonically increasing with time.

Figure 1:
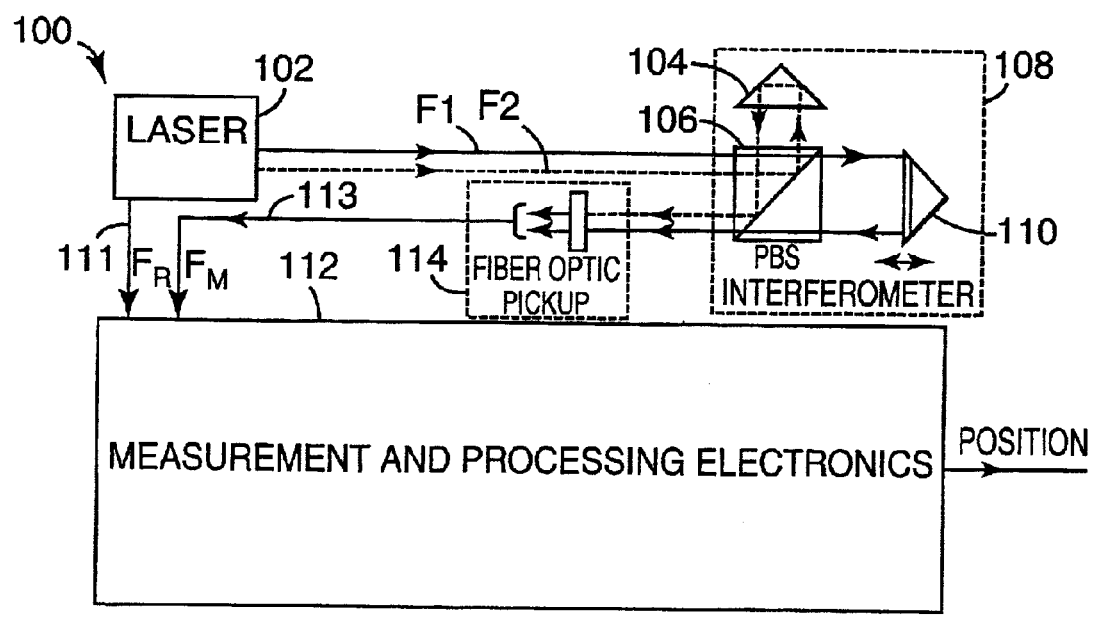
FIG. 1 is an electrical block diagram illustrating a prior art displacement measuring heterodyne interferometer system.

FIG. 1 is an electrical block diagram illustrating a prior art heterodyne displacement measuring interferometer system 100. Interferometer system 100 includes laser 102, interferometer 108, measurement and processing electronics 112, and fiber optic pickup 114. Interferometer 108 includes stationary retroreflector 104, polarizing beam splitter (PBS) 106, and movable retroreflector 110.

Laser 102 generates a pair of collinear, orthogonally-polarized optical beams of equal intensity and of different frequencies $F_1$ and $F_2$, which differ in frequency by $F_R$, which is a reference frequency (also referred to as a split frequency). The optical beams pass through interferometer 108. Polarization beam splitter 106 reflects one polarization of the incoming light to stationary retroreflector 104, and passes the other polarization of light to movable retroreflector 110. The retroreflectors 104 and 110 return the light to the polarization beam splitter 106, where one beam is transmitted and the other beam is reflected, so that the two beams are again collinear. Linear motion of the movable retroreflector 110 results in a corresponding change in the difference in phase between the two beams. The output beams from interferometer 108 go to fiber optic pick-up 114. In fiber optic pick-up 114, the output beams from interferometer 108 are mixed, and the mixed beam is coupled to an optical fiber 113. The mixed beam is referred to as the measurement signal, and the mixing is represented by the following Equation I:

$$\text{Measurement signal} = \overline{F}_1 \otimes F_2 \quad \text{Equation I}$$

where:

⊗ indicates a mixing operation; and the overhead line on $F_1$ indicates that the signal is Doppler-shifted.

Measurement and processing electronics 112 contain a fiber optic receiver that produces an electrical measurement signal corresponding to the optical measurement signal. The measurement signal has a frequency that is equal to the reference frequency, $F_R$, plus the Doppler shift frequency, as shown in the following Equation II:

$$F_M = F_R + nv/\lambda \quad \text{Equation II}$$

where:

v is the velocity of the interferometer element whose position is being measured (the sign of v indicates the direction of travel);

$\lambda$ is the wavelength of light emitted from laser 102; and n equals 2, 4, etc., depending on the number of passes the light makes through interferometer 108. In embodiments of the present invention, n=4.

In the example system of FIG. 1, the movement of retroreflector 110 produces the Doppler shift and n is equal to 2. Laser 102 also outputs a reference signal at the reference frequency ($F_R$) via a fiber optic cable 111 that goes to a fiber optic receiver in the measurement and processing electronics 112. The reference signal is produced by mixing the two beams from laser 102 ($F_1$ and $F_2$), which is represented by the following Equation III:

$$\text{Reference Signal} = F_1 \otimes F_2 \quad \text{Equation III}$$

Measurement and processing electronics 112 contain a fiber optic receiver that produces an electrical reference signal corresponding to the optical reference signal. The reference signal has a frequency that is equal to the reference frequency $F_R$.

Measurement and processing electronics 112 measure and accumulate the phase difference between the reference signal and the measurement signal, and process the difference to provide position and velocity outputs.

II. Non-linearity

In less than ideal situations, light leakage between beams from laser 102 occurs, causing a small amount of one frequency to be present in the other frequency. Symbolizing the ideal by a capital letter and leakage by a lower-case letter, the non-ideal situation can be symbolized by the following Equation IV and Equation V:

$$\text{Measurement Signal: } \overline{F_1 + f_1} \otimes (F_2 + f_1) \quad \text{Equation IV}$$

$$\text{Reference Signal: } (F_1 + f_2) \otimes (F_2 + f_1) \quad \text{Equation V}$$

Through mixing, signals of many frequencies are produced. The measurement signal has six mixed components:

M1:$\overline{F}_1 \otimes F_2$; M2:$\overline{F}_1 \otimes f_1$; M3:$f_1 \otimes F_2$; M4:$f_1 \otimes \overline{F}_1$; M5:$\overline{f}_1 \otimes F_2$; M6:$f_1 \otimes \overline{f}_1$ The reference signal also has six mixed components:

R1:$F_1 \otimes F_2$; R2:$F_1 \otimes f_2$; R3:$f_1 \otimes F_2$; R4:$f_1 \otimes F_1$; R5:$f_2 \otimes F_2$; R6:$f_1 \otimes f_2$;

The signals M1 and R1 are the desired measurement and reference signals, respectively, not non-linearity. Typically, M1 and R1 are the dominant components.

The signals M6 and R6 are each mixing products of two typically small signals, producing only second-order effects. Signals M6 and R6 may be ignored.

The signals R2, R3, R4, and R5 are static parameters. The signals R2 and R3 have the same frequency as the ideal signal R1, which is the reference or split frequency. The combined effect of R2 and R3 is to cause an inconsequential constant phase shift to the reference signal. Signals R4 and R5 are "steady" signals mixing with themselves, resulting only in a static DC amplitude shift. A "steady" signal is a signal that is not Doppler shifted. In an AC-coupled circuit, R4 and R5 produce no effect, and may be ignored.

Non-linearity caused by M2 and M3 is most obvious at moderate velocities (e.g., under about 50 mm/sec). M2 and M3 produce an interference signal at the Reference frequency that perturbs the measurement signal, M1, to cause non-linearity. The temporal frequency of the non-linearity is the Doppler frequency, and therefore the spatial frequency of the non-linearity is invariant (it is always one period in $\lambda/4$ of the distance traveled). Non-linearity caused by M2 and M3 is periodic with the position data with a period of 1 UI, or 1 "fringe," representing $\lambda/4$ of the distance traveled. For a HeNe laser, $\lambda$ is 633 nanometers. The spatial frequency invariance property of M2 and M3 type of non-linearity facilitates compensation.

The signals M4 and M5 are a type non-linearity that is observed at high speed of the measurement object away from the light source. The mixing product of M4 has the form shown in the following Equation VI:

$$\cos 2\pi\left(F_1 t - \frac{p_1}{\lambda/4}\right) \otimes \cos 2\pi(F_1 t) \Rightarrow \cos 2\pi\left(\frac{p_1}{\lambda/4}\right) \quad \text{Equation VI}$$

where:

$p_1$ is a position parameter; and $\lambda$ is the wavelength of light emitted from laser 102

Similarly, the mixing product of M5 has the form shown in the following Equation VII:

$$\cos 2\pi\left(F_2 t - \frac{p_2}{\lambda/4}\right) \otimes \cos 2\pi(F_2 t) \Rightarrow \cos 2\pi\left(\frac{p_2}{\lambda/4}\right) \quad \text{Equation VII}$$

where:

$p_2$ is a position parameter; and $\lambda$ is the wavelength of light emitted from laser 102

The position-parameters $p_1$ and $p_2$ may have different origins, but are almost identically scaled due to $F_1$ being only a few megahertz from $F_2$ in one embodiment. The temporal frequency of M4 and M5 is the same, and equals the Doppler frequency, $f_{Doppler} = f_R - f_M$. The M4 and M5 signals perturb the measurement signal, at $f_M - f_{Doppler}$, producing non-linearity at the temporal frequency of $2*f_M - f_R$. In one embodiment, M4 and M5 type of non-linearity can be seen only when the measurement frequency nears half the reference frequency, which occurs when the object is moving rapidly (e.g., typically about 0.5 m/sec) within a small range of velocities away from the source. Unfortunately, neither the temporal nor spatial frequency of M4 and M5 type of non-linearity is invariant, making its compensation more complex. In addition to the position-data, the measurement channel frequency is needed. One embodiment of the present invention compensates non-linearity caused by the signals M4 and M5.

The non-linearity perturbation, $\Delta\phi(t)$, (in UI), as a function of time, is shown in the following Equation VIII:

$$\Delta\phi(t) = \left(\frac{1}{2\pi}\right) \arctan\left[\frac{r\cos 2\pi[(2f_M - f_R)t - \theta]}{1 - r\sin 2\pi[(2f_M - f_R)t - \theta]}\right] \quad \text{Equation VIII}$$

where:
  r is the ratio of the magnitudes of the combined perturbing M4/M5 signal to that of the ideal signal M1; and
  $\theta$ is a phase-offset between the phase progression of $(2f_M - f_R)$ and the non-linearity pattern of the position data at the same frequency.

III. Non-Linearity Compensation

A. Overview of Compensation System

In one embodiment of the present invention, the measured position data output by an interferometer system 100 and the phase progression of the measurement channel are processed, and two best-fit, quasi-static, non-linearity parameters are produced to compensate data in the near future. Continuing the process indefinitely, all data after an initial latency period are compensated. In one form of the invention, non-linearity magnitude and phase parameters are determined on-the-fly from 320 consecutive position-data words and 320 measurement channel phase progression words, and are used to compensate the position-data words immediately following. One form of the invention is a completely digital process that continues in "leapfrog" fashion, compensating all future data using the periodically updated non-linearity parameters.

Figure 2:
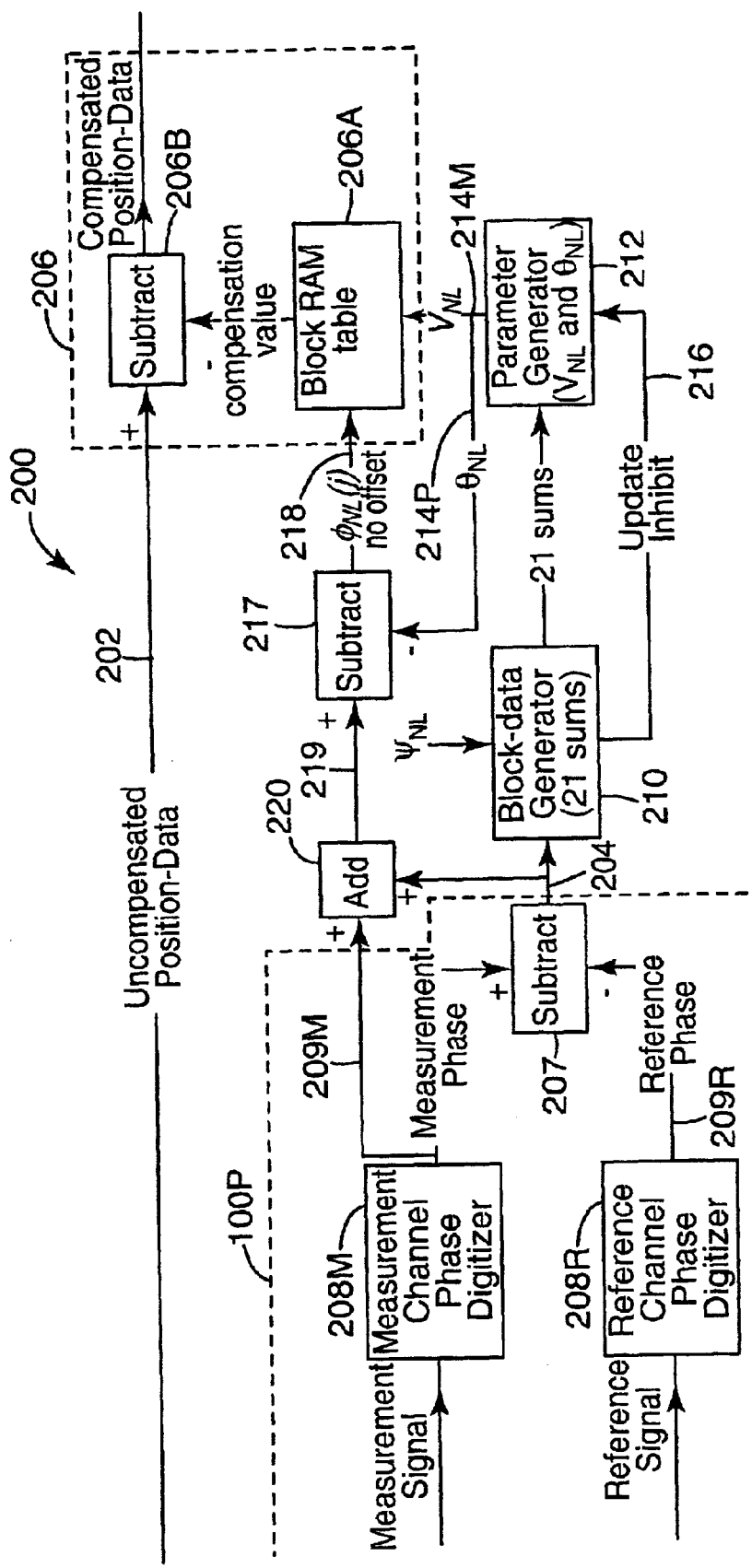
FIG. 2 is a functional block diagram illustrating a high velocity non-linearity compensation system according to one embodiment of the present invention.

FIG. 2 is a functional block diagram illustrating a non-linearity compensation system 200 according to one embodiment of the present invention. FIG. 2 also shows a phase digitizing portion 100P of interferometer system 100. Phase digitizing portion 100P includes a measurement channel phase digitizer 208M, a reference channel phase digitizer 208R, and arithmetic logic unit (ALU) 207. Measurement channel phase digitizer 208M produces measurement channel phase data 209M based on a received measurement signal. Reference channel phase digitizer 208R produces reference channel phase data 209R based on a received reference signal. ALU 207 produces observed position data 204 based on the difference between measurement channel phase data 209M and reference channel phase data 209R.

Non-linearity compensation system 200 includes compensation processing block 206, block data generator 210, parameter generator 212, and ALUs 217 and 220. Compensation processing block 206 includes block RAM table 206A and ALU 206B. In one embodiment, non-linearity compensation system 200 compensates M4 and MS type of non-linearity in uncompensated position data 202, which includes observed position data 204 output by interferometer system 100, and may also include expanded position data (e.g., expanded through extrapolation).

Observed position data 204 (p(j)) from interferometer system 100 are provided to ALU 220 and block data generator 210. ALU 220 also receives measurement channel phase data 209M from interferometer system 100. ALU 220 sums observed position-data 204 (p(j)) and measurement channel phase data 209M. The sum of observed position-data 204 (p(j)) and measurement channel phase data 209M is the non-linearity phase progression 219 $\psi_{NL}(j)$, which is provided to ALU 217 and block data generator 210.

In one embodiment, both observed position-data 204 (p(j)) and non-linearity phase progression 219 ($\psi_{NL}(j)$) are output at a 3.2 microsecond rate and are used by block-data generator 210 in groups of 320 to produce 21 sums for each group. These sums, in turn, are used by parameter generator 212 to construct non-linearity parameters 214M and 214P (collectively referred to as non-linearity parameters 214). The "j" in p(j) is an index for identifying observed position-data words and corresponding words of measurement channel phase data 209M at a 3.2 microsecond rate. In one embodiment, non-linearity parameters 214 include a non-linearity (NL) magnitude parameter 214M ($V_{NL}$), and a NL phase offset parameter 214P ($\theta_{NL}$). Block RAM table 206A is synthesized from the non-linearity magnitude parameter 214M ($V_{NL}$). The non-linearity phase offset parameter 214P ($\theta_{NL}$) is provided to ALU 217.

ALU 217 subtracts the non-linearity phase offset parameter 214P ($\theta_{NL}$) from the non-linearity phase progression 219 ($\psi_{NL}(j)$) to form offset-removed phase progression parameter 218 ($\phi_{NL}(j)$), which continuously addresses block RAM table 206A.

Uncompensated position data 202 is provided to compensation processing block 206. ALU 206B subtracts compensation values obtained from block RAM table 216A from uncompensated position data 202 to produce compensated position data. Incoming data 202 is non-linearity compensated at a higher, lower, or the same interferometer output rate of 3.2 microseconds. Meanwhile, "future" uncompensated, non-linearity phase progression data 219 ($\psi_{NL}(j)$) and position data 204 (p(j)) are used by block-data generator 210 and parameter generator 212 to generate yet further non-linearity parameters 214 to compensate for yet more future position data. After an initial latency period, all data will be compensated.

Since the non-linearity parameters 214M and 214P are quasi-static and continually updated, the process acts as a tracking filter, producing appropriate parameters 214 from recent position data 204. In one form of the invention, the compensation performed by compensation processing block 206 is at nanosecond speed.

In one embodiment, block data generator 210 detects when unfavorable conditions for accurate measurement occur, and generates an update inhibit signal 216. When an update inhibit signal is generated, parameter generator 212 stops updating non-linearity parameters 214. During this time, position data is compensated by compensation processing block 206 using the existing non-linearity parameters 214. Updating of the non-linearity parameters 214 continues when measurement conditions improve.

In one embodiment, the functions performed by non-linearity compensation system 200 are limited to digital numerical computation by hardware, firmware, or a combination, and system 200 includes no optical or analog electrical circuitry. In one form of the invention, compensation system 200 is implemented using field programmable gate arrays (FPGAs) and/or one or more DSP processors.

Figure 3:
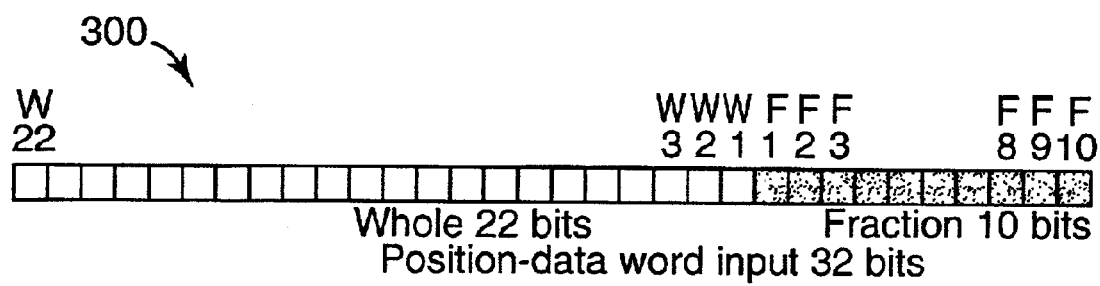
FIG. 3 is a diagram illustrating a position-data word output by the interferometer system of FIG. 1.

FIG. 3 is a diagram illustrating an observed position-data word 300 output by interferometer system 100. Position-data word 300 includes 32 bits. The most significant 22 bits (W1–22) of word 300 represent travel of multiples of one whole fringe of $\lambda/4$. The least significant 10 bits (F1–10) of word 300 represent the fractional portion of a fringe.

B. Block Data Generation

Figure 4:
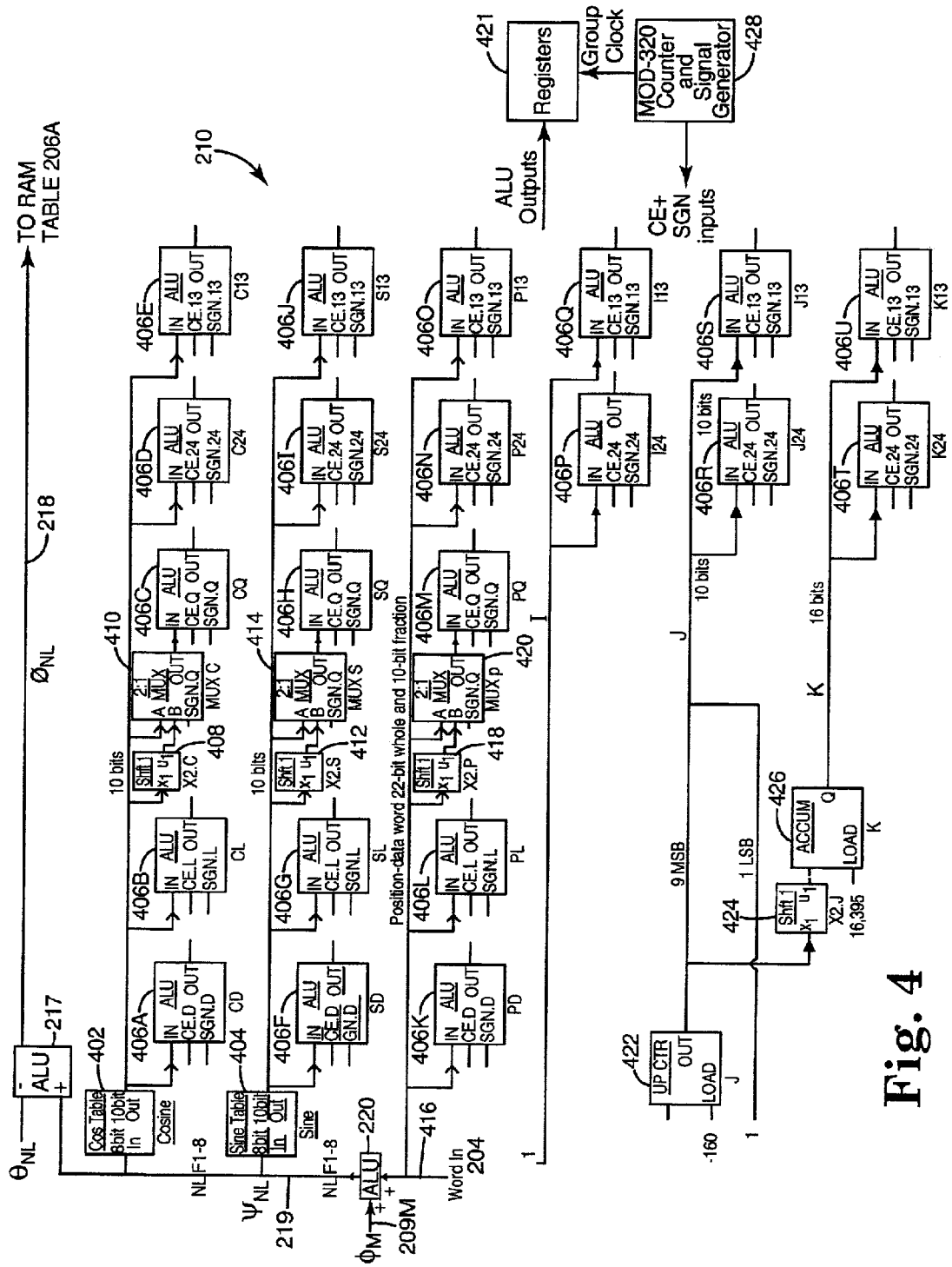
FIG. 4 is an electrical schematic diagram illustrating one embodiment of the block-data generator shown in FIG. 2.

FIG. 4 is an electrical schematic diagram illustrating one embodiment of the block-data generator 210 shown in FIG. 2. Block data generator 210 includes cosine lookup table 402, sine lookup table 404, arithmetic logic units (ALUs) 406A–406U (collectively referred to as ALUs 406), bit shifter 408, multiplexer 410, bit shifter 412, multiplexer 414, bit shifter 418, multiplexer 420, registers 421, up counter 422, bit shifter 424, accumulator 426, and modulo-320 counter and signal generator 428. In one embodiment, the digital circuits shown in FIG. 4 are clocked synchronously at a 3.2 microsecond rate. The clocking circuit is omitted from FIG. 4 to simplify the illustration of the invention.

Observed position-data words 300, which are 32 bits wide, arrive at 3.2 microsecond intervals at "word in" terminal 416. The fractional part of position-data words 300 is added to the fractional part of measurement channel phase progression data 209M ($\phi_M(j)$) at ALU 220. In one embodiment, block data generator 210 processes the received words of position-data 204 (p(j)) and measurement channel phase data 209M ($\phi_M(j)$) in groups of 320 words, and generates 21 output data blocks for each set of 320 words of position-data 204, and 320 words of measurement channel phase data 209M.

Figure 5A:
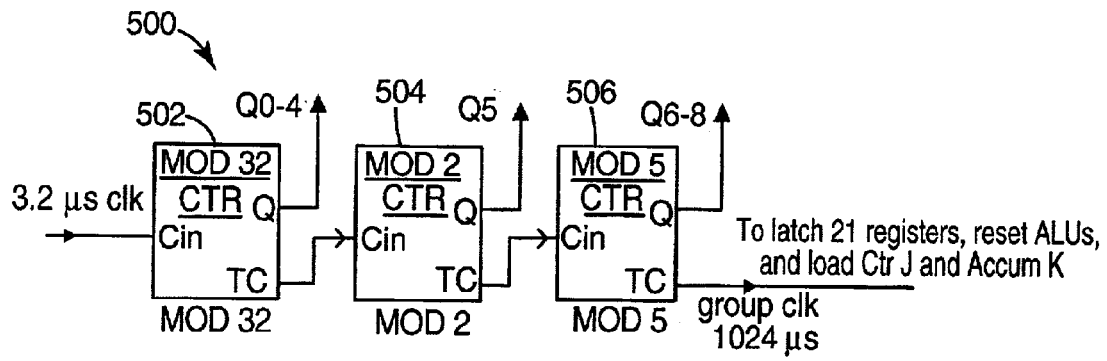
FIG. 5A is an electrical schematic diagram illustrating a modulo-320 counter for generating counter signals for controlling the operation of the block-data generator shown in FIG. 4.
Figure 5B:
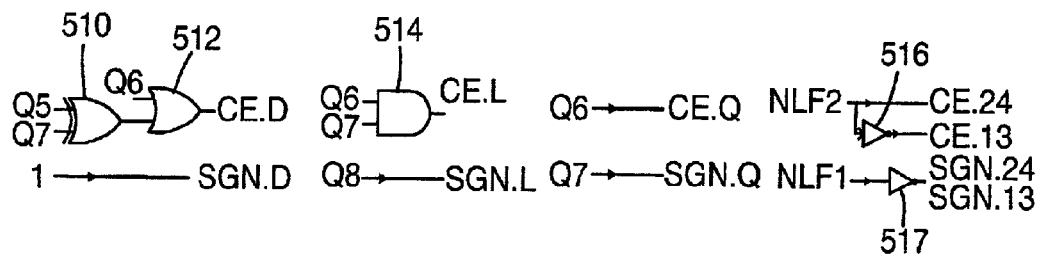
FIG. 5B is a diagram illustrating control signals for controlling the operation of the block-data generator shown in FIG. 4.

Modulo-320 counter and signal generator 428 includes modulo-320 counter 500 (shown in FIG. 5A), and logic gates 510, 512, 514, 516 and 517 (shown in FIG. 5B). The processing performed by block-data generator 210 is scheduled by modulo-320 counter 500. Modulo-320 counter 500 comprises a cascade of three counters—modulo-32 counter 502, modulo-2 counter 504, and modulo-5 counter 506. Modulo-32 counter 502 and modulo-2 counter 504 are traditional binary up-counters. Modulo-5 counter 506 counts in a perpetually recurring sequence 3-4-5-6-7.

The clock-in input (Cin) of modulo-32 counter 502 is coupled to a 3.2 microsecond clock signal. The terminal count (TC) output of modulo-32 counter 502 is coupled to the clock-in input of modulo-2 counter 504. The output (Q) of modulo-32 counter 502 is the 5 least significant bits (Q0–Q4) of the counter 500. The terminal count output of modulo-2 counter 504 is coupled to the clock-in input of modulo-5 counter 506. The output (Q) of modulo-2 counter 504 is the fourth most significant bit (Q5) of counter 500. The output (Q) of modulo-5 counter 506 is the three most significant bits (Q6–Q8) of counter 500.

A group clock signal is produced every 1024 microseconds at the terminal count of modulo-5 counter 506. The four most significant bits (Q5–Q8) of counter 500, and the most significant two bits (NLF1 and NLF2) of the fractional parts of the non-linear phase 219 ($\Psi_{NL}$) are logically combined to generate 10 signals for controlling the 21 ALUs 406 as shown in the following Table I:

TABLE I

| Signal # | Name | Logical Combination |
|---|---|---|
| 1. | CE.D | Q6 + (Q5 ⊕ Q7) |
| 2. | SGN.D | 1 |
| 3. | CE.L | Q6 · Q7 |
| 4. | SGN.L | Q8 |
| 5. | CE.Q | Q6 |
| 6. | SGN.Q | Q7 |
| 7. | CE.24 | NLF2 |
| 8. | CE.13 | NOT(NLF2) |
| 9. | SGN.24 | NOT(NLF1) |
| 10. | SGN.13 | NOT(NLF1) |

In the above Table I, "+" indicates a logical OR operation, "⊕" indicates a logical EXLUSIVE OR operation, and "●" indicates a logical AND operation.

FIG. 5B is a diagram illustrating the 10 control signals listed in Table I, and the logic gates for generating some of the signals. As shown in FIG. 5B, signal CE.D is generated by performing an EXCLUSIVE-OR operation on counter bits Q5 and Q7 with EXCLUSIVE-OR gate 510, and then performing a logical OR operation with OR gate 512 on counter bit Q6 and the output of EXCLUSIVE-OR gate 510. Signal SGN.D is a constant logical 1. Signal CE.L is generated by performing a logical AND operation on counter bits Q6 and Q7 with AND gate 514. Signal SGN.L is generated from counter bit Q8. Signal CE.Q is generated from counter bit Q6. Signal SGN.Q is generated from counter bit Q7. Signal CE.24 is generated from the second most significant fractional bit, NLF2, of non-linear phase 219 ($\Psi_{NL}$). Signal CE.13 is generated by inverting with inverter 516 the second most significant fractional bit, NLF2, of non-linear phase 219 ($\Psi_{NL}$). Signals. SGN.24 and SGN.13 are generated from the complement of the most significant fractional bit, NLF1, of non-linear phase 219 ($\Psi_{NL}$) through inverter 517 creating the complement.

Of the 10 signals shown in FIG. 5B, the SGN.x signals are coupled to corresponding SGN.x (polarity) inputs of ALUs 406, and the CE.x signals are coupled to corresponding CE.x (clock enable) inputs of ALUs 406, where "x" identifies the particular SGN and CE signals (e.g., D, L, Q, 13, or 24) that are coupled to a particular ALU 406. For example, as shown in FIG. 4, ALU 406A includes clock enable input CE.D, and polarity input SGN.D, indicating that signals CE.D and SGN.D, respectively, are coupled to these inputs of ALU 406A. The connection lines are not shown in FIG. 4 to simplify the illustration of the invention.

Figure 6:
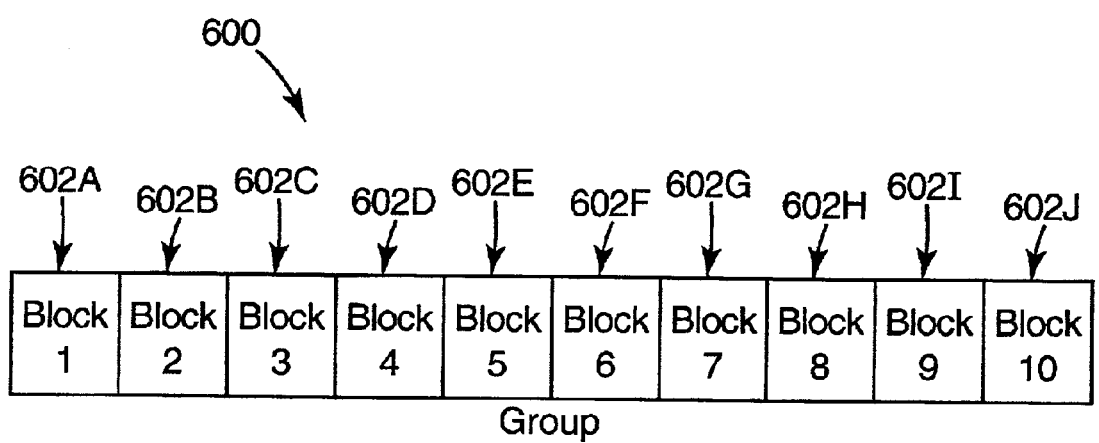
FIG. 6 is a diagram of a group of 320 position-data words partitioned into 10 blocks of 32 words each.

The counter arrangement 500 illustrated in FIG. 5A effectively partitions a group of 320 input words 300 into ten sequential blocks of 32 words each, numbering block 1 through block 10. FIG. 6 is a diagram of a group 600 of 320 position-data words 300, partitioned into 10 blocks 602A–602J (collectively referred to as blocks 602) of 32 words each.

A CE.x signal, when TRUE, enables corresponding ALUs 406. A SGN.x signal, when TRUE, dictates increment for an enabled ALU 406, and decrement when the signal is FALSE. The CE.x and SGN.x signals affect operation of ALUs 406 as shown in the following Table II:

TABLE II

| ALU's | Operation |
|---|---|
| 1. ALUs 406A (CD), 406F (SD), and 406K (PD) | D: increment in blocks 1, 2, 4, 5, 6, 7, 9, 10; disabled in blocks 3 and 8. |
| 2. ALUs 406B (CL), 406G (SL), and 406L (PL) | L: decrement in blocks 1, 2; disabled in blocks 3, 4, 5, 6, 7, 8; increment in blocks 9, 10. |
| 3. ALUs 406C (CQ), 406H (SQ), 406M (PQ) | Q: increment in blocks 1, 2, 9, 10; disabled in blocks 3, 4, 7, 8; decrement by twice the values in blocks 5, 6. |

As shown in the following Table III, regardless of the particular block 602 being processed, the following ALUs 406 operate only on the logical values of the most significant two fractional bits (NLF1, NLF2) non-linear phase 219 ($\Psi_{NL}$):

TABLE III

| ALU's | Operation |
|---|---|
| 1. ALUs 406D (C24), 406I (S24), 406N (P24), 406P (I24), 406R (J24), 406T (K24) | "24": increment on (0, 1); decrement on (1, 1); disabled on (0, 0) and (1, 0). |

TABLE III-continued

| ALU's | Operation |
| --- | --- |
| 2. ALUs 406E (C13), 406J (S13), 406O (P13), 406Q (I13), 406S (J13), 406U (K13) | "13": increment on (0, 0); decrement on (1, 0); disabled on (0, 1) and (1, 1). |

Words 300 of position-data 204 received on terminal 416, each 32-bits in width, are connected to the inputs of ALUs 406K (PD), 406L (PL), 406N (P24), and 406O (P13), bit shifter 418, and multiplexer 420. A second input (input B) of multiplexer 420 is the position-data word 300 multiplied by 2 through shifting by 1 bit with bit shifter 418. The multiplexed position-data output by multiplexer 420 is connected to ALU 406M (PQ). Multiplexer 420 is steered by the same control bit, SGN.Q, as ALU 406M (PQ). This arrangement results in the value of ALU 406M (PQ) being incremented by the position-data word 300 on TRUE SGN.Q, but decremented by twice the position data-word 300 on FALSE SGN.Q.

For summation purposes, the width of position-data words 300 can be reduced from 32 bits to 24 bits without penalty by subtracting a constant integer, such as the "whole" part of the last data word 300 from the last group 600, from each of the 320 subsequent position-data words 300.

The most significant 8 bits (F1–F8) of the fractional part of words of position-data 204 received on terminal 416 are added by ALU 220 to the fractional part of the measurement channel phase progression words 209M ($\phi_M(j)$). The sum, signified as $\psi_{NL}(j)$ (and referred to as non-linearity phase progression 219), addresses two look-up tables—cosine lookup table 402 and sine lookup table 404. Lookup tables 402 and 404 each span one complete period in the 8-bit address space. There are, therefore, 256 entries in each table 402 and 404 of one-period. Each entry in tables 402 and 404 is 10 bits wide.

The output of cosine table 402 is connected to the inputs of ALUs 406A (CD), 406B (CL), 406D (C24), and 406E (C13), bit shifter 408, and multiplexer 410. A second input (input B) of multiplexer 410 is the output of cosine table 402 multiplied by 2 through shifting by 1 bit with bit shifter 408. The multiplexed position-data output by multiplexer 410 is connected to ALU 406C (CQ). Multiplexer 410 is steered by the same control bit SGN.Q as ALU 406C (CQ). This arrangement results in the value of ALU 406C (CQ) being incremented by the output value of table 402 on TRUE SGN.Q, but decremented by twice the output value of table 402 on FALSE SGN.Q.

The output of sine table 404 is connected to the inputs of ALUs 406F (SD), 406G (SL), 406I (S24), and 406J (S13), bit shifter 412, and multiplexer 414. A second input (input B) of multiplexer 414 is the output of sine table 404 multiplied by 2 through shifting by 1 bit with bit shifter 412. The multiplexed position-data output by multiplexer 414 is connected to ALU 406H (SQ). Multiplexer 414 is steered by the same control bit SGN.Q as ALU 406H (SQ). This arrangement results in the value of ALU 406H (SQ) being incremented by the output value of table 404 on TRUE SGN.Q, but decremented by twice the output value of table 404 on FALSE SGN.Q.

In addition to processing position-data words 300 and measurement channel phase words 209M, block data generator 210 also synthesizes three 320 clock length (1024 microseconds) digital sequences I, J, and K. The digital sequences I, J, and K, are repeated once per group 600 of 320 clocks at 3.2 microseconds, or 1024 microseconds.

Sequence I is a constant logical 1, and is connected to the inputs of ALUs 406P (I24) and 406Q (I13). Sequence I is one bit wide. Therefore, ALUs 406P (I24) and 406Q (I13) could be simple counters in an alternative embodiment. Sequence I sums to $2^8$ under Operation D, and zero under operations L and Q. Operations D, L and Q are summarized above in Table II.

Sequence J linearly progresses from −159.5 to +159.5 by +1 per step. Sequence J comprises 9 bits from up-counter 422 concatenated with 1 least significant bit of a constant logical 1. Sequence J is 10 bits wide and connects to the inputs of ALUs 406R (J24) and 406S (J13). Sequence J sums to $2^{14}$ under Operation L, and zero under operations D and Q.

Sequence K is quadratic, and numerically equals $J^2$−9,045.25 at each step. Sequence K is 16 bits wide, and is connected to the inputs of ALUs 406T (K24) and 406U (K13). The value 9,045.25 equals (64.127.129−96.191.193+160.321.319)/(12.128), which ensures that K sums to zero when blocks 1, 2, 4, 5, 6, 7, 9, and 10, are summed. Sequence K is synthesized by loading 16,395 into accumulator 426 at the beginning of a new group 600 of position-data words 300, and accumulating (2·J−1) at each step, which is twice the value of counter 422 alone, that is, without the 1 concatenated least significant bit. J is multiplied by 2 through shifting J by 1 bit with bit shifter 424. Sequence K sums to $2^{21}$ under Operation Q, and zero under operations D and L.

The terminal count output of modulo-5 counter 506 generates a group clock signal every 1024 microseconds, which indicates the end of a group 600 of position-data words 300. The group clock signal from modulo-5 counter 506 is coupled to 21 registers 421. Each of the 21 registers 421 is also coupled to the output of one of the 21 ALUs 406. When the group clock signal is received by registers 421, all 21 outputs of the ALUs 406 are latched to the 21 registers 421. ALUs 406 are then reset to zero, and up-counter 422 and accumulator 426 are loaded with values 160 and 16,395, respectively. After being reset, ALUs 406 are once again receptive to new entries.

C. Generation of Non-linearity Parameters (Magnitude $V_{NL}$ and Phase $\theta_{NL}$)

The 21 values latched by registers 421 from ALUs 406 are $I_{24}$, $J_{24}$, $K_{24}$, $C_{24}$, $S_{24}$, $P_{24}$, $I_{13}$, $J_{13}$, $K_{13}$, $C_{13}$, $S_{13}$, $P_{13}$, $P_D$, $P_L$, $P_Q$, $C_D$, $C_L$, $C_Q$, $S_D$, $S_L$, and $S_Q$, which are output by ALUs 406P, 406R, 406T, 406D, 406I, 406N, 406Q, 406S, 406U, 406E, 406J, 406O, 406K, 406L, 406M, 406A, 406B, 406C, 406F, 406G, and 406H, respectively. The 21 values are digitally processed by parameter generator 212 to produce the magnitude $V_{NL}$ and phase $\theta_{NL}$ of any non-linearity present in the signal using the mathematical procedure shown in the following Equations IX through XIX.

Six quantities, $P_{24}'$, $C_{24}'$, $S_{24}'$, $P_{13}'$, $C_{13}'$, and $S_{13}'$, are generated as follows:

$$P_{24}' = P_{24} - \frac{I_{24} \cdot P_D}{2^8} - \frac{J_{24} \cdot P_L}{2^{14}} - \frac{K_{24} \cdot P_Q}{2^{21}} \qquad \text{Equation IX}$$

$$C_{24}' = C_{24} - \frac{I_{24} \cdot C_D}{2^8} - \frac{J_{24} \cdot C_L}{2^{14}} - \frac{K_{24} \cdot C_Q}{2^{21}} \qquad \text{Equation X}$$

$$S_{24}' = S_{24} - \frac{I_{24} \cdot S_D}{2^8} - \frac{J_{24} \cdot S_L}{2^{14}} - \frac{K_{24} \cdot S_Q}{2^{21}} \qquad \text{Equation XI}$$

-continued $$P'_{13} = P_{13} - \frac{I_{13} \cdot P_D}{2^8} - \frac{J_{13} \cdot P_L}{2^{14}} - \frac{K_{13} \cdot P_Q}{2^{21}} \quad \text{Equation XII}$$

$$C'_{13} = C_{13} - \frac{I_{13} \cdot C_D}{2^8} - \frac{J_{13} \cdot C_L}{2^{14}} - \frac{K_{13} \cdot C_Q}{2^{21}} \quad \text{Equation XIII}$$

$$S'_{13} = S_{13} - \frac{I_{13} \cdot S_D}{2^8} - \frac{J_{13} \cdot S_L}{2^{14}} - \frac{K_{13} \cdot S_Q}{2^{21}} \quad \text{Equation XIV}$$

From the six quantities calculated in Equations IX through XIV, non-linearity parameters $V_{NL}$ and $\theta_{NL}$ are generated as shown in the following Equations XV through XIX:

$$\det = -C_{24}' \cdot S_{13}' + C_{13}' \cdot S_{24}' \quad \text{Equation XV}$$

$$A_{NL} = -S_{13}' P_{24}' + S_{24}' P_{13}' \quad \text{Equation XVI}$$

$$B_{NL} = C_{13}' P_{24}' - C_{24}' P_{13}' \quad \text{Equation XVII}$$

Non-linearity magnitude $V_{NL} = (A_{NL}^2 + B_{NL}^2)^{1/2}/\det$    Equation XVIII Non-linearity phase $\theta_{NL} = \arctan(B_{NL}/A_{NL})/2\pi$    Equation XIX Both the non-linearity magnitude $V_{NL}$ and phase $\theta_{NL}$ are expressed in UI, where one UI represents $\lambda/4$. The peak position-deviation from ideal is $V_{NL}$ and the location of the periodic pattern is given by the phase $\theta_{NL}$.

In one embodiment, only fixed-point computations are performed by compensation system 200, and division operations are limited to powers of 2. In one form of the invention, the process performed by compensation system 200 is implemented with either hardware or firmware, or a combination of hardware and firmware.

D. Non-linearity Compensation Using Generated Parameters

The non-linearity pattern that is a subject of embodiments of the present invention is a result of single-side-band (SSB) modulation and is not a single sinusoid. Specifically, $\Delta\phi(\phi)$, the phase deviation from ideal as a function of non-linearity phase $\phi$, is given in UI by the following Equation XX:

$$\Delta\phi(\phi) = \left(\frac{1}{2\pi}\right)\arctan\left(\frac{r \cdot \cos[2\pi(\phi-\theta)]}{1 - r \cdot \sin[2\pi(\phi-\theta)]}\right) \quad \text{Equation XX}$$

where:
 r is the ratio of the perturbing signal magnitude to the ideal signal magnitude; and
 Angle $\theta$ is a phase difference between the non-linearity periodicity $\Delta\phi(\phi)$ and the non-linearity phase progression $\phi$. The block regression process measures the phase offset as $\theta_{NL}$.

For small deviations, $\Delta(\phi)$ is well approximated by the following Equations XXI through XXIV:

$$\Delta\phi(\phi) \approx \left(\frac{1}{2\pi}\right)\left(\frac{r \cdot \cos[2\pi(\phi-\theta)]}{1 - r \cdot \sin[2\pi(\phi-\theta)]}\right) \quad \text{Equation XXI}$$

$$\Delta\phi(\phi) = \frac{\left(\frac{r}{2\pi}\right) \cdot \cos[2\pi(\phi-\theta)]}{1 - 2\pi \cdot \left(\frac{r}{2\pi}\right)\sin[2\pi(\phi-\theta)]} \quad \text{Equation XXII}$$

$$\Delta\phi(\phi) \approx V_{NL} \cdot \cos 2\pi(\phi-\theta_{NL}) \cdot [1 + 2\pi \cdot V_{NL} \sin 2\pi(\phi-\theta_{NL})] \quad \text{Equation XXIII}$$

$$\Delta\phi(\phi) \approx V_{NL} \cdot \cos 2\pi(\phi-\theta_{NL}) + \pi \cdot V_{NL}^2 \sin 4\pi(\phi-\theta_{NL}) \quad \text{Equation XXIV}$$

The quantity $r/2\pi$ in Equation XXII is measured as $V_{NL}$, the magnitude, in Equations XXIII and XXIV, and $\theta$ in Equation XXII appears as deviation phase, $\theta_{NL}$, in Equations XXIII and XXIV. Both quantities $V_{NL}$ and $\theta_{NL}$ are determined in one embodiment using the block regression method described above. The values of $V_{NL}$ and $\theta_{NL}$ are estimated accurately using only the cosine term. The sine term, being orthogonal at exactly twice the frequency, need not be involved in the block regression estimation, but plays a part in determining the actual compensation value.

Even though the non-linearity parameters (magnitude-$V_{NL}$, and phase-$\theta_{NL}$) are derived from measured data that arrive at a rate of one every 3.2 microseconds, they may be used to compensate position data at any rate for the next 1024 microseconds.

The following Equation XXV can be described as the phase deviation $\Delta\phi(j)$ at any time step j, as a function of the ideal non-linear phase $\phi(j)$:

$$\Delta\phi(j) \approx V_{NL} \cdot \cos 2\pi(j) + \pi \cdot V_{NL}^2 \sin 4\pi\phi(j) \quad \text{Equation XXV}$$

where $V_{NL}$ is a measured value.

Equation XXV shows the expected non-linearity phase deviation $\Delta\phi(j)$ given the ideal phase $\phi(j)$. The value $\theta_{NL}$ is also a measured value. It is subtracted from the non-linearity phase progression ($\psi_{NL}(j)$) to generate an offset-removed non-linearity phase progression $\phi_{NL}(j)$. In practice, the ideal $\phi(j)$ is not available. But $\phi_{NL}(j)$ itself is subject to non-linearity perturbation and is different from the ideal $\phi(j)$ by an unknown amount $\Delta\phi(j)$ as shown in the following Equation XXVI:

$$\phi_{NL}(j) = \phi(j) + \Delta\phi(j) \quad \text{Equation XXVI}$$

The phase deviation $\Delta\phi_{NL}(j)$ based on the corrupted argument $\phi_{NL}(j)$ is:

$$\Delta_{NL}(j) \approx V_{NL} \cdot \cos 2\pi\phi_{NL}(j) + \pi \cdot V_{NL}^2 \sin 4\pi\phi_{NL}(j) \quad \text{Equation XXVII}$$

This quantity in Equation XXVII, however, is not exactly the compensation needed as it is based on a corrupted argument.

Assuming changes are piecewise linear near the region between $\phi_{NL}(j)$ and $\phi(j)$, these two are also related as shown in the following Equation XXVIII:

$$\Delta\phi(j) = \Delta\phi_{NL}(j) - \Delta'\phi_{NL} \cdot \Delta\phi(j) \quad \text{Equation XXVIII}$$

The desired deviation $\Delta\phi(j)$ can be solved as:

$$\Delta\phi(j) = \frac{\Delta\phi_{NL}(j)}{1 + \Delta'\phi_{NL}} = \frac{V_{NL} \cdot \cos[2\pi\phi_{NL}(j)] + \pi \cdot V_{NL}^2 \sin[4\pi\phi_{NL}(j)]}{1 - 2\pi V_{NL} \sin[2\pi\phi_{NL}(j)] + 4\pi^2 V_{NL}^2 \cos[4\pi\phi_{NL}(j)]} \quad \text{Equation XXIX}$$

For small values of $V_{NL}$ (e.g., $V_{NL} \ll \frac{1}{2}\pi$), making use of $1/(1-\delta) \approx 1+\delta$, and dropping all terms involving $V_{NL}^3$ or higher, $\Delta\phi(j)$ may be simplified as shown in the following Equations XXX and XXXI:

$$\Delta\phi(j) \approx (V_{NL} \cos[2\pi\phi_{NL}(j)] + \pi V_{NL}^2 \sin[4\pi\phi_{NL}(j)]) \cdot (1 + 2\pi V_{NL} \sin[2\pi\phi_{NL}(j)]) \quad \text{Equation XXX}$$

$$\Delta\phi(\phi_{NL}) = V_{NL} \cdot \cos 2\pi\phi_{NL} + 2\pi \cdot V_{NL}^2 \cdot \sin 4\pi\phi_{NL} \quad \text{Equation XXXI}$$

Therefore, the desired phase deviation $\Delta\phi(j)$ may be constructed from the corrupted phase $\phi_{NL}(j)$ quite accurately up to the second harmonics by Equation XXXI.

In one embodiment, $\Delta\phi$ is computed into a single read/write memory table 206A (shown in FIG. 7), having 256 entries spanning one period of the $\phi_{NL}$, and addressable by the 8 most significant fractional bits, NLF1–NLF8 of $\phi_{NL}$. Each entry in table 206A is 8 bits wide in accordance with equation XXXI.

Figure 7:
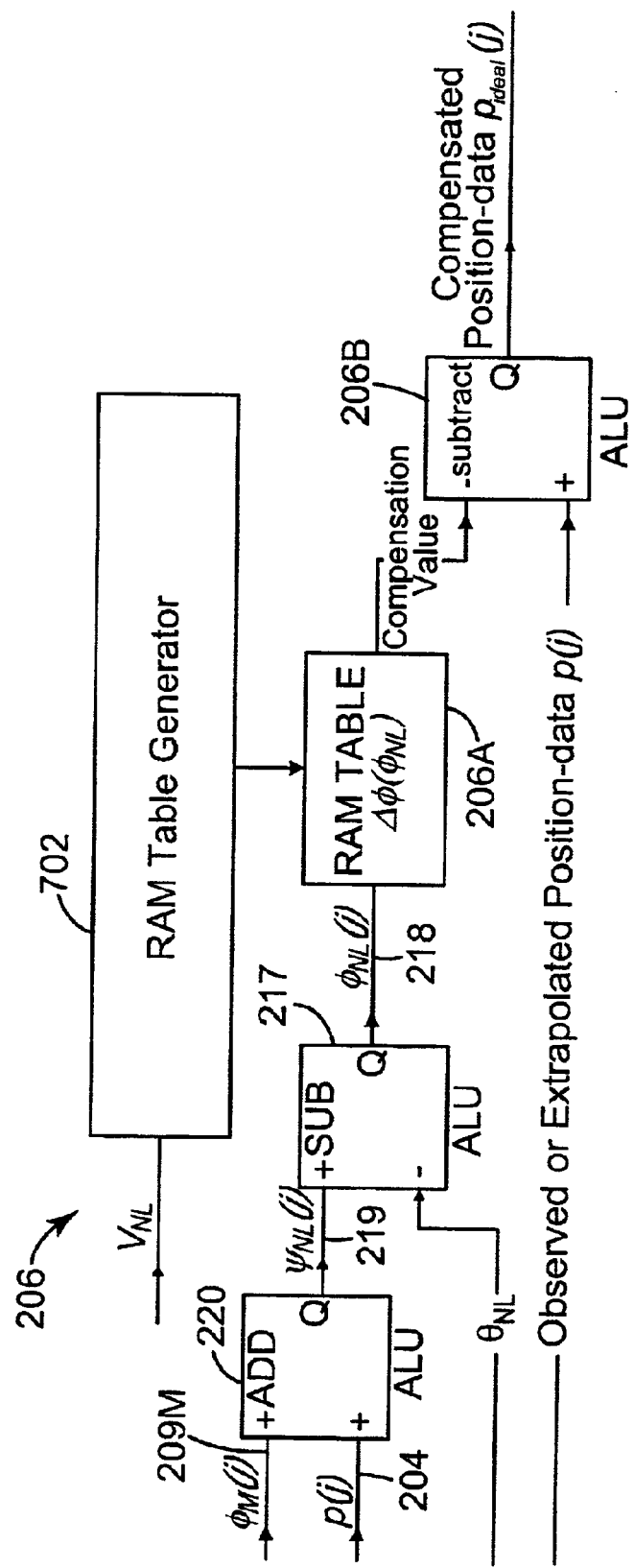
FIG. 7 is an electrical block diagram illustrating one embodiment of the compensation processing block shown in FIG. 2.

FIG. 7 is an electrical block diagram illustrating in greater detail the compensation processing block 206 shown in FIG. 2. Compensation processing block 206 includes RAM table generator 702, RAM table 206A, and ALU 206B. In one form of the invention, RAM table 206A includes 256 values for $\Delta\phi$, calculated from Equation XXXI, using fractional $\phi$ values that span one period. The various values for $\Delta\phi$ in RAM table 206A are represented by $\Delta\phi(\phi_{NL})$, where the relationship is as in Equation XXXI. RAM table 206A is generated by RAM table generator 702 based on non-linearity parameter, $V_{NL}$, provided by parameter generator 212. The other non-linearity parameter $\theta_{NL}$, also provided by parameter generator 212, is subtracted from current observed non-linearity data words, $\psi_{NL}(j)$, by ALU 217 to generate the non-linear phase progression $\phi_{NL}(j)$. RAM table generator 702 updates the $\Delta\phi(j)$ values stored in RAM table 206A each time a new value for $V_{NL}$ is received. As described above, $V_{NL}$ and $\theta_{NL}$ are calculated every 1024 microseconds (i.e., every 320 position-data words 300 and the corresponding measurement channel phase progression words 209M).

At any given time-index, j, the (corrupted) phase $\phi_{NL}(j)$ will address the table 206A. RAM table 206A is addressable by the 8 most significant fractional bits NLF1–NLF8 of the non-linear phase progression $\phi_{NL}(j)$. The $\Delta\phi$ values as addressed by the non-linearity phase $\phi_{NL}(j)$ at a 3.2 microsecond rate are output by RAM table 206A to ALU 206B. The value output by table 206A is precisely the compensation needed at the moment. ALU 206B subtracts the value output by table 206A from the current position-data word to get the compensated data word regardless of the rate of position-data words being compensated. ALU 206B subtracts the $\Delta\phi$ values received from RAM table 206A from received position data, including, in one embodiment, measured or observed position data and extrapolated position data.

The non-linearity progression $\phi_{NL}(j)$, which is derived from observed position data by subtracting an offset $\theta_{NL}$, determines the non-linearity present at any time, irrespective of the data rate of the uncompensated position data. The mathematical representation of the compensation process for extrapolated position data is shown in the following Equation XXXII:

$$p_{ideal}(i) = p(i) - V_{NL} \cdot \cos 2\pi\phi_{NL}(j) - 2\pi \cdot V_{NL}^2 \cdot \sin 4\pi\phi_{NL}(j) \qquad \text{Equation XXXII}$$

where i stands for any data rate; and j stands for the observed data rate.

E. Update Suspension of Non-linearity Parameters

In one embodiment, when the measurement channel frequency approaches half the reference channel frequency to within ±7.8125 kHz, or within multiples of 312.500 kHz ±7.8125 kHz, the updating of the quasi-static non-linearity parameters $\theta_{NL}$ and $V_{NL}$ is suspended. When one of these velocity conditions is present, block-data generator 210 (shown in FIG. 2) sends an update inhibit signal 216 to parameter generator 212, indicating that updating of the non-linearity parameters is to be suspended. In one form of the invention, the test for the absence of the above frequency conditions is: (1) A group of 320 non-linearity phase data words 219 must have at least 8 "quadrant" transitions within 1024 microseconds; and (2) the group of 320 non-linearity phase data words 219 must not dwell on any one quadrant for more than 128 microseconds.

A "quadrant" is defined by the most significant two bits (NLF1 and NLF2) of the fractional part of non-linearity phase data words as shown in the following Table IV:

TABLE IV

| (NLF1, NLF2) | Name |
|---|---|
| 0, 0 | $1^{st}$ quadrant |
| 0, 1 | $2^{nd}$ quadrant |
| 1, 0 | $3^{rd}$ quadrant |
| 1, 1 | $4^{th}$ quadrant |

The non-linearity parameters $\theta_{NL}$ and $V_{NL}$ are updated when one or both of the above two tests are satisfied. If neither test is satisfied, updating of the non-linearity parameters is suspended. The non-linearity parameter values calculated prior to suspension are held and used to compensate new position data in an uninterrupted manner. Updating of the non-linearity parameters resumes only when either or both of the above two tests are satisfied.

In some metrology systems, when the difference between twice the measurement channel frequency and the reference channel frequency is high, a tracking filter eliminates the perturbing effect of the leakage signal, and there is no significant non-linearity present in the data. One embodiment of the present invention bypasses the compensation process during such high frequency difference conditions.

Embodiments of the present invention are applicable primarily to heterodyne interferometers. In one embodiment, the interferometer itself is not modified in any way. Rather, the resulting measurement data output by the interferometer is processed, and two best-fit quasi-static non-linearity parameters are produced to compensate data in the near future. Continuing the process indefinitely, all data after an initial latency period are compensated. Embodiments of the invention involve only digital numerical computation by hardware, firmware, or a combination. In one form of the invention, no optical or analog electrical circuitry is used. No Fourier transformation or other spectral analysis methods are employed in one embodiment.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method for compensating non-linearity of the high-velocity type manifested in heterodyne interferometer position data, the method comprising:

receiving a plurality of groups of digital position values;

receiving a plurality of groups of digital phase values from a measurement channel;

digitally processing a first group of the digital position values and digital phase values to generate a plurality of block data values;

digitally processing the plurality of block data values to generate at least one quasi-static non-linearity parameter; and compensating a second group of the digital position values based on the at least one quasi-static non-linearity parameter.

2. The method of claim 1, wherein the first group includes only measured digital position values and digital phase values.

3. The method of claim 1, wherein the second group includes only measured digital position values.

4. The method of claim 1, wherein the second group includes measured digital position values and extrapolated digital position values.

5. The method of claim 1, wherein each group of digital position values includes 320 position-data words.

6. The method of claim 5, wherein the first group is processed in 10 blocks of 32 words each.

7. The method of claim 6, wherein each position-data word is 32 bits.

8. The method of claim 1, wherein the at least one quasi-static non-linearity parameter is generated based on a block regression technique.

9. The method of claim 1, wherein the at least one quasi-static non-linearity parameter includes a non-linearity magnitude parameter and a non-linearity phase parameter.

10. The method of claim 1, wherein a temporal frequency of the non-linearity being compensated is the difference between the measurement channel frequency and Doppler frequency.

11. A compensation system for compensating a high velocity type of non-linearity in heterodyne interferometer position data, the system comprising:
a first input for receiving a plurality of groups of digital position values, each digital position value including a whole number portion and a fractional number portion;
a second input for receiving a plurality of groups of phase values from a measurement channel;
a digital position-data processor for digitally processing a first group of the digital position values and measurement channel phase values and generating a plurality of data values;
a digital data value processor for processing the plurality of data values and generating at least one non-linearity parameter; and
a digital compensator for compensating a second group of the digital position values based on the at least one non-linearity parameter.

12. The compensation system of claim 11, wherein the digital position-data processor comprises:
a cosine look-up table for providing cosine values corresponding to a fractional portion of the sum of received digital position values and measurement channel phase values;
a sine look-up table for providing sine values corresponding to a fractional portion of the sum of received digital position values and measurement channel phase values;
a first plurality of arithmetic logic units (ALUs) for arithmetically processing the cosine values and the sine values, each ALU in the first plurality configured to output one of the plurality of data values based on the arithmetic processing; and
a second plurality of ALUs for arithmetically processing received digital position values, each ALU in the second plurality configured to output one of the plurality of data values based on the arithmetic processing.

13. The compensation system of claim 12, wherein the digital position-data processor further comprises:
a plurality of registers coupled to the ALUs in the first and the second pluralities for storing the plurality of data values.

14. The compensation system of claim 13, wherein the digital position-data processor further comprises:
a counter coupled to the plurality of registers, the counter configured to cause the registers to store the plurality of data values at the end of each group of digital position values.

15. The compensation system of claim 14, wherein the counter is configured to generate signals for controlling operation of the first and the second plurality of ALUs.

16. The compensation system of claim 12, and further comprising:
a digital sequence generator for generating a plurality of digital sequences; and
a third plurality of ALUs coupled to the digital sequence generator for arithmetically processing the digital sequences, each ALU in the third plurality configured to output one of the plurality of data values based on the arithmetic processing.

17. The compensation system of claim 16, wherein the plurality of digital sequences include a constant sequence, a linearly increasing sequence with zero mean, and a quadratic sequence with zero mean, and wherein summation of one of the sequences results in a power-of-2 value, and summation of each of the remaining sequences results in a zero value.

18. The compensation system of claim 11, wherein each group of digital position values includes 320 position-data words, and wherein each group of measurement phase values includes 320 measurement phase words.

19. The compensation system of claim 18, wherein each position-data word is 32 bits.

20. The compensation system of claim 11, wherein the at least one non-linearity parameter includes a non-linearity magnitude parameter and a non-linearity phase parameter.

21. The compensation system of claim 11, wherein a temporal frequency of the non-linearity being compensated is the difference between the measurement channel frequency and Doppler frequency.

22. A displacement measuring heterodyne interferometer system comprising:
a light source for generating at least one light beam;
an interferometer for generating an optical measurement signal based on the at least one light beam;
a receiver for receiving the optical measurement signal and an optical reference signal, the receiver configured to generate an analog measurement signal based on the optical measurement signal and configured to generate an analog reference signal based on the optical reference signal;
a controller for generating a plurality of groups of digital position values and measurement channel phase values based on the analog measurement signal and the analog reference signal; and
at least one digital signal processor coupled to the controller for digitally processing each group of the digital position values and measurement channel phase values and generating a plurality of data values for each processed group, the at least one digital signal processor configured to digitally process the plurality of data values for each processed group to generate at least one non-linearity parameter for each processed group, the at least one digital signal processor configured to non-linearity compensate digital position values based on the at least one non-linearity parameter, wherein the non-linearity being compensated is of a type occurring at relatively high velocities.

23. The interferometer system of claim 22, wherein each group of digital position values includes 320 position-data words and each group of measurement channel phase values includes a corresponding 320 data words.

24. The interferometer system of claim 22, wherein the at least one non-linearity parameter includes a non-linearity magnitude parameter and a non-linearity phase parameter.

25. The interferometer system of claim 22, wherein a temporal frequency of the non-linearity being compensated is the difference between the measurement signal frequency and Doppler frequency.

* * * * *